United States Patent [19]

Ara et al.

[11] Patent Number: 5,378,291
[45] Date of Patent: Jan. 3, 1995

[54] COATING COMPOSITION FOR METAL

[75] Inventors: Masayasu Ara; Akira Katoh, both of Tokyo, Japan

[73] Assignee: Nihon Parkerizing Co., Ltd., Tokyo, Japan

[21] Appl. No.: 61,341

[22] Filed: May 17, 1993

Related U.S. Application Data

[63] Continuation of Ser. No. 643,962, Jan. 22, 1991, abandoned.

[30] Foreign Application Priority Data

Jan. 23, 1990 [JP] Japan .................. 2-11747

[51] Int. Cl.$^6$ ............................ C23C 22/30
[52] U.S. Cl. ........................ 148/251; 148/246
[58] Field of Search ................. 148/251, 246

[56] References Cited

U.S. PATENT DOCUMENTS

| | | | |
|---|---|---|---|
| 3,185,596 | 3/1965 | Schiffman | 148/251 |
| 4,891,268 | 1/1990 | Fourez | 148/246 |
| 4,966,634 | 10/1990 | Saeki | 148/251 |

FOREIGN PATENT DOCUMENTS

| | | | |
|---|---|---|---|
| 0197882 | 10/1985 | Japan | 148/251 |
| 61-60766 | 3/1986 | Japan . | |
| 61-279687 | 12/1986 | Japan . | |

*Primary Examiner*—Sam Silverberg
*Attorney, Agent, or Firm*—Armstrong, Westerman, Hattori, McLeland & Naughton

[57] ABSTRACT

A coating composition for metallic surfaces contains:
(1) $Cr^{6+}$, or $Cr^{6+}$ and $Cr^{3+}$,
(2) 1–50% of lubricant(s) dispersed by a nonionic emulsifying agent,
(3) acryl-series polymer emulsion, which is obtained by emulsion-polymerizing, by means of a nonionic emulsifying agent which is essentially free of anionic and cationic emulsifying agent and which contains a polyoxyethylene-polyoxpropy lene block polymer, monomers of A), B), and C):

A) a monomer of ethylene-series, unsaturated carboxylic acid

B) one or more monomers selected from a), b), and c):
  a) alkoxyethylene(metha)acrylamide and its derivative(s) expressed by the following general formula $$CH_2=\underset{X}{\overset{|}{C}}-CONH-CH_2O-Y$$

X is $C_nH_{2n+1}$ (n=0 or 1)
Y is $C_mH_{2m+1}$ (m=0–4)
  b) acid phospho-oxyalkyl(metha)acrylate, and
  c) alkoxy-alkyl(metha)acrylate
C) one or more acryl-series monomers (a part of which may consist of 2)(c)).

4 Claims, No Drawings

COATING COMPOSITION FOR METAL

This application is a continuation of application Ser. No. 07/643,962 filed Jan. 22, 1991, now abandoned.

BACKGROUND OF INVENTION

1. Field of Invention

The present invention relates to a coating composition for simultaneously chromating a metallic surface and forming an organic resin coating on the metallic surface. More particularly, the present invention relates to a coating composition for metal, which enables the formation of a coating having improved lubricating property.

The general application of the coating composition for metal according to the present invention is for production of surface-treated metallic materials, to which lubricating property, formability, corrosion-resistance, paint adhesion, post-painting corrosion-resistance, and resistance against finger marks are imparted. In the coating-formation process, metallic materials, such as steel, aluminum, zinc, tin, copper, and their alloys in the form of coils, sheets, wires, or rods are subjected to the formation of a coating on the surfaces thereof.

2. Description of Related Arts

Heretofore in the field of metal-forming and painting on metals, the above described metallic materials have been generally subjected, subsequent to forming thereof or prior to paint-coating thereon, to such surface treatment as chromating or phosphating. Recently, in order to omit the coating step in the forming or paint-coating process thereby reducing cost, an attempt has been made for the above described metallic materials to be preliminarily surface-treated to form a coating and then subjected to application of press oil, followed by forming. The preliminarily surface-treated metallic materials may be degreased and then subjected to paint coating; that is, surface treatment steps, such as chromating and phosphating, are omitted during the production process of the final products. The metallic materials are, therefore, formed and/or paint-coated, but are neither chromated nor phosphatized in the production step of the final product. Several articles are already actually produced by this method.

Application of an aqueous resin and chromating agent is one of the representative methods for coating metallic materials. In one method for such application, reaction-type chromating agents are applied, followed by water rinsing, and then an agent mainly composed of organic resin is applied. According to another, aqueous resin, in which chromating agents are blended (hereinafter referred to as the "chromate-containing aqueous resin") is applied. The former method is disclosed, for example, in Japanese Unexamined Patent Publication No. 58-224,175, while the latter method is disclosed, for example, in Japanese Unexamined Patent Publication No. 63-145,785. According to these methods, labor can be saved and cost can be reduced because the chromating of final products can be omitted. The present applicant is one of the co-applicants of the Japanese Unexamined Patent Publication No. 63-145,785. The surface-treated materials produced by this method exhibit improved resistance against corrosion and finger marks. These properties are not degraded after alkali degreasing or solvent degreasing. These methods are, therefore, used widely, particularly by makers of home electric appliances.

When the surface-treated material, which is produced by the above described methods, is formed, it exhibits improved formability over the conventionally surface-treated steel, i.e., phosphated or chromated steel, because the resin layer applied by the above described methods is present, as an intermediary, between the metallic material and the tool. The formability is, however unsatisfactory, in that the surface-treated material must preliminarily be subjected to application of press oil or the like and then be formed. The preliminary application of press oil or the like is necessary regardless of the kind of coating, that is, the reaction type chromating followed by resin coating or the coating of the chromate-containing aqueous resin. The once applied oil or the like must be removed in the degreasing step prior to the paint-coating step. The degreasing and subsequent paint-coating steps are, however, complicated.

SUMMARY OF INVENTION

It is an object of the present invention to omit the complicated steps, i.e., application of press-oil and subsequent degreasing.

In order to attain this object, the present invention provides a coating composition for metals for imparting lubricating property thereto. The coated materials provided by the present invention can be formed without application of lubricating oil or the like and are then directly subjected to paint-coating without undergoing degreasing. The coating composition according to the present invention must, therefore, provide, in addition to the lubricating properties, excellent adhesion of the top-coating paint.

The present inventors repeated various researches and then discovered that, by means of blending, in a chromate-containing aqueous resin, from 1 to 50% by weight of lubricant in terms of nonvolatile component and, further, by means of dispersing the lubricant in a chromate-containing aqueous resin with the aid of a nonionic emulsifying agent, the lubricating properties and formability of the coating film are improved.

The coating composition of metals provided by the present invention is a chromate-containing aqueous resin with dispersed lubricant. This composition contains hexavalent chromium ions or both hexavalent and trivalent chromium ions as the inorganic compounds, the following acrylic copolymer-emulsion as the organic compounds and from 1 to 50% by weight (in terms of nonvolatile matters) of one or more lubricants as the lubricating component, which are dispersed by a nonionic emulsifying agent. Said composition has a pH of not more than 5.

The acrylic copolymer emulsion according to the present invention is the one obtained by emulsion-polymerizing a monomer which is one or more members selected from a group consisting of the following 1), 2) and 3), by means of a nonionic emulsifying agent which is essentially free of anionic and cationic emulsifying agents and which contains a polyoxyethylenepolyoxypropylene block polymer.

1) one or more monomers of ethylene-series, unsaturated carboxylic acids
   a) alkoxyethylene (metha)acrylamide and its derivative(s) expressed by the following general formula

X is $C_nH_{2n+1}$ (n=0 or 1)
Y is $C_mH_{2m+1}$ (m=0-4)

b) acid phospho-oxyalkyl(metha)acrylate, and
c) alkoxy-alkyl(metha)acrylate 3) one or more acryl-series monomers (a part of which may consist of 2) (c)).

The acryl-series polymer emulsion used, according to the present invention is the emulsion-copolymerized monomers of the respective 1), 2) and 3) groups, by means of a nonionic emulsifying agent which is essentially free of anionic and cationic emulsifying agents and contains a polyoxyethylene-polyoxypropylene block polymer.

The monomers of the respective groups are explained hereinafter.

The monomers of ethylene-series, unsaturated carboxylic acids indicate unsaturated, mono- or di-carboxylic acid. The monomers of ethylene-series unsaturated carboxylic acids are the source for supplying the carboxylic group which contributes to the adherence mainly with metal. The monomers of ethylene-series unsaturated carboxylic acid according to 1) include acrylic acid, methacrylic acid, crotonic acid, itaconic acid, maleic acid, or fumaric acid, and their half esters.

The alkoxyethylene(metha)acrylamide and its derivative(s) according to 2) (a), expressed by the general formula:

X is $C_nH_{2n+1}$ (n=0 or 1)
Y is $C_mH_{2m+1}$ (m=0-4),
is alkoxymethylene acrylamide when n=0, and is alkoxymethylene methacrylamide when n=1, and is methoxyethylene(metha)acrylamide when m=0, ethoxyethylene(metha)acrylamide when m=1, propanoxymethylene(metha)acrylamide when m=2, butoxymethylene(metha)acrylamide when m=3, and pentoxymethylene(metha)acrylamide when m=4.

The acid phospho-oxyalkyl(metha)acrylate according to 2)(b) includes acid phospho-oxymethylacrylate, acid phospho-oxyethylacrylate, acid phospho-oxypropylacrylate, acid phospho-oxymethylmethacrylate, acid phospho-oxyethylmethacrylate, acid phosphooxypropylmethacrylate, and the like.

The alkoxy alkyl(metha)acrylate according to 2)(c) includes methoxy-methylacrylate, methoxy-ethylacrylate, methoxy-methyl-methacrylate, methoxy-ethylmethacrylate, ethoxy-methylacrylate, ethoxy-ethylacrylate, ethoxy-methylmethacrylate, ethoxy-ethyl-methacrylate, and the like.

The monomers of (a), (b) and (c) above improve the adherence of the inventive coating film with metallic surfaces and the adherence of paint with the inventive coating film, due to their N-substituted methylol group($CH_2$=C—CONH), phosphoric acid-group, and the alkoxyl group, respectively. This effect is, therefore, obtained by at least one of (a), (b) and (c), mentioned above.

The skeleton of the inventive treatment-coating is provided by the acryl-series monomer(s) according to 3).

The acryl-series monomer(s) of 3) are methylacrylate, methylmethacrylate, ethylacrylate, ethylmethacrylate, isopropylacrylate, isopropylmethacrylate, n-butylacrylate, n-butylmethacrylate, 2-ethylhexylacrylate, 2-ethylhexylmethacrylate, octylacrylate, octylmethacrylate, acrylonitrile, methacrylonitrile, acrylamide, methacrylamide, and even alkoxyalkyl(metha)acrylate according to 2) (c).

The copolymerizing monomer, which is included if necessary in 3), is styrene, methyl styrene, vinyl acetate, vinyl ester of saturated carboxylic acid branched at the alpha site, vinyl chloride, vinyl toluene, ethylene, and the like.

Accordingly, there are the following combinations in 3).

① acryl-series monomer which is of a different kind from the alkoxy-alkyl(metha)acrylate according to 2) (c). Therefore, 3) is not common with 2) (c).
② ①+alkoxy alkyl(metha)acrylate. A part of 3) is, therefore, common with 2) (c), while the other part of 3) is not common with 2) (c).
③ alkoxy alkyl(metha)acrylate. 3) is, therefore, common with 2) (c).
④ ①+copolymerizing monomer
⑤ ②+copolymerizing monomer
⑥ ③+copolymerizing monomer The monomer(s) of 3) constitutes the acryl-series emulsion used in the present invention is a basic monomer, which predominates over such physical properties as the hardness and softness, flexibility, elongation, elasticity, glass-transition temperature, the lowest temperature of coating formation, as well as the chemical stability.

The alkoxyalkyl(metha)acrylate is a peculiar one in that it has the effect of enhancing the adherence as the monomer of 2) and also has the effect of skeleton as the monomer 3). Accordingly, a special constitution is employed in the present invention such that alkoxy alkyl(metha)acrylate is included both in 2) and 3). Accordingly, there is one combination of the monomers 1), 2), and 3), the combination of acrylic acid-alkoxyalkyl(metha)acrylate-styrene. The acryl-series polymer emulsion obtained by such combination attains satisfactory effects as the organic compounds used in the present invention.

In the polymerization of acryl series-polymer emulsion, the emulsifying agent used in the present invention is nonionic. The nonionic emulsifying agent includes polyoxyethylene alkylether, polyoxyethylene alkylphenolether, polyoxyethylene alkylester, sorbitan alkylester, polyoxyethylenesorbitan alkylester, polyoxyethylene-polyoxypropylene block polymer, and the like. If a significant amount of an ionic emulsifying agent is present in the emulsifying agent, the miscible stability with the chromic acid is considerably lowered in the resultant emulsion, even if the polyoxyethylene-polyoxypropylene block polymer (EO-PO block polymer) is used. The ionic emulsifying agent should, therefore, not be contained in the emulsifying agent used according to the present invention.

The polyoxyethylene-polyoxypropylene block polymer (EO-PO block polymer) is used in the emulsion polymerization. The emulsion having a considerably improved stability in miscibility with chromic acid is obtained by carrying out the emulsion polymerization with the use of EO-PO block polymer. The proportion of EO-PO block polymer in the nonionic emulsifying agent is preferably in the range of from 5% by weight to 100% by weight. When the proportion of EO-PO block polymer is increased, there is an enhanced tendency for coarse emulsion particles to form. However, the formation of coarse emulsion particles can be avoided through setting the concentration of the finally obtained emulsion low.

It is, therefore, possible to use the nonionic emulsifying agent consisting only of EO-PO block polymer. When the proportion of EO-PO block polymer in the nonionic emulsifying agent is less than 5%, the miscibility with chromic acid is not satisfactory.

The hexavalent chromium ions used in the present invention are fed in the form of chromic acid or chromate compound to the coating composition. Chromic acid can be usually fed in the form of chromic anhydride or aqueous solution of chromic acid anhydride, while the chromate can be fed in the form of the ammonium, potassium, strontium, barium, sodium, and zinc salts of chromic acid or bichromic acid.

The hexavalent chromium acid is a strong oxidizing agent, and has the effect of protecting the metal from corrosion. In addition, a part of the hexavalent chromium ions is reduced to trivalent chromium ions by the functional groups of the resin and emulsifying agent, while the acryl series polymer-emulsion is heated in the drying step for the coating formation. These partially reduced chromium ions render the hexavalent chromium ions difficult to dissolve in water and the resin to polymerize as macro-molecule.

The trivalent chromium ions of the inorganic compound, which are occasionally used in the present invention, can be formed by adding into the aqueous solution, which contains chromium ions, such reducing agents as methanol, ethanol, oxalic acid, starch, hydrogen peroxide, and pyrogallol, thereby partially reducing the hexavalent chromium ions. Alternatively, the trivalent chromium ions can be fed by dissolving chromium carbonate, chromium hydoxide, or chromium oxide in an aqueous solution of chromic acid.

The hexavalent chromium and chromic acid have a rust-proof property making rust difficult to form on metal. They also have, however, a property of easily dissolving in water. When the coating once formed on a metallic surface is brought into contact with moisture, the hexavalent chromium and chromic acid are easily dissolved and leave the coating. The result is that not only is the rust-proof property of the coating lost considerably but there arises a danger of causing industrial pollution. The trivalent chromium is bonded with hexavalent chromium (chromic acid) to form chromic chromate which is difficult to dissolve in the water. The trivalent chromium, therefore, suppresses the dissolution of hexavalent chromium from the coating and contributes to maintaining the rust-proof property and preventing environmental pollution. When such compounds as chromium nitrate, chromium sulfate, chromium chloride, and chromium alum are used, couple anions are left in the composition in the form of liquid. A part or majority of trivalent chromium ions is bonded with the above anions to form the water-soluble trivalent chromium compound and hence to decrease the formation amount of chromic chromate, which is difficult to dissolve in water. The use of the above compounds is therefore not preferred.

In addition, the trivalent chromium is bonded with the functional groups in the resin and causes the macromolecular polymerization of acrylic polymer resin due to its cross linking. As a result, the resistance of the coating formed on the metallic surface against the alkaline detergent solution is enhanced.

The proportion of acryl-series polymer emulsion to hexavalent and trivalent chromium ions is preferably such that the resin/total chromium is from 200 to 0.2.

When this proportion exceeds 200, the resistance against alkali is so lowered that the coating formed has a low corrosion-resistance and low adherence with paint film. In addition, when this proportion is less than 0.2, the effects of acryl-series polymer resin are not adequate to attain satisfactory water and alkali-resistance and coating adherence with the top-coating paint.

The proportion of trivalent chromium ions to hexavalent chromium ions, i.e., $Cr^{3+}/Cr^{6+}$, is preferably 1 or less in the light of stability of reagents, in the case that acids other than chromic acid, such as phosphoric acid, are not contained. $Cr^{3+}/Cr^{6+}$ is preferably 5 or less, in the case that such acid as phosphoric acid is contained since corrosion-resistance by the hexavalent chromium is expected.

The composition according to the present invention, in which acryl-series polymer resin emulsion, chromic acid and lubricant are the indispensable components, should be used at a pH of 5 or less. The chromate-containing aqueous resin, to which the lubricant is not yet added, should have 5 or less of pH.

When the pH exceeds 5, paint adherence becomes poor. In addition, the adherence of the inventive surface-coating film to the metallic material becomes poor. As a result, when a metallic material with the inventive surface coating is subjected to deep drawing, such coating peels, impairing the lubricating properties.

When the polymer emulsion having the monomer composition disclosed by the present invention is unneutralized, the pH of composition becomes 5 or less. In any case where pH exceeds 5, it can be adjusted by means of chromic acid or phosphoric acid.

The lubricant used in the present invention has the effect of decreasing friction resistance during the forming. The lubricant partially melts due to heat generated during the forming and has hence the effect of preventing sticking between a workpiece and the metal die.

The known lubricants can be used in the present invention. Examples of the lubricant are given below.

Group of hydrocarbonaceous lubricants: natural paraffin, synthetic paraffin, micro-wax, polyethylene wax, chlorinated hydrocarbon, fluorocarbon, or the like.

Group of fatty acid-lubricants: lauric acid, stearic acid, palmitic acid, oxy fatty acid, or the like.

Group of fatty acid amide-lubricants: amide stearate, amide palmitate, methyl-bisstearamide, ethylene bisstearamide, oleate amide, erucylamide, alkylene bis-fatty acid amide, or the like.

Group of ester lubricants: ester of lower alcohol and fatty acid, such as butylstearate, ester of polyhydric alcohol and fatty acid, such as hardened castor oil, glycolester of fatty acid, such as ethyleneglycol monostearate or polyglycol ester, ester wax, or the like.

Group of alcohol lubricants: cetyl alcohol, stearyl alcohol, palmityl alcohol, or the like.

Group of metal soaps: calcium stearate, lead stearate, calcium laurate, calcium palmitate, or the like.

Group of metal sulfides: molybdenum disulfide, tungsten disulfide, or the like.

Fluorine-containing polymer: polytetrafluoroethylene, polytrifluoroethylene, polyvinylidene fluoride, polyvinyl fluoride, or the like.

Miscelleneous: graphite, graphite fluoride, boron nitride or the like.

In the polymerization of the lubricants, only the nonionic emulsifying agent can be used in the present invention. The nonionic emulsifying agent includes polyoxyethylene alkylether, polyoxyethylene alkylphenolether, polyoxyethylene alkylester, sorbitan alkylester, polyoxyethylene-sorbitan alkylester, polyoxyethylenepolyoxypropylene block polymer, per fluoroalkyl oxyethylene adduct and the like.

The amount of emulsifying agent used is preferably from 1 to 20% by weight based on the amount of the lubricant used.

When the amount of the emulsifying agent is less than 1% by weight, settling and precipitation of the lubricant are likely to occur. Even if settling and precipitation do not occur, the miscibility is poor because coagulation occurs when the lubricant is blended with the chromate-containing aqueous resin. When the amount of the emulsifying agent is more than 20% by weight, the film formed by the coating composition has poor water and alkali-resistance. Any one of the lubricants may be used alone. However, two or more lubricants may be used in combination so as to further enhance the lubricating properties. The lubricant is dispersed in an appropriate amount of water, preferably deionized water, with the aid of the emulsifying agent.

The amount of lubricant blended in the coating composition according to the present invention is from 1 to 50% by weight, preferably from 5 to 40% by weight. When the amount of lubricant is less than 1% by weight, the lubricating properties are not satisfactory. On the other hand, when the amount of lubricant is 51% by weight or more, the formed coating film has low strength and poor adherence with the metallic materials. The lubricating properties, corrosion-resistance, alkali-resistance, solvent-resistance, and coating-adherence are thus impaired.

The phosphate ions which may be added to the inventive coating composition can be supplied in the form of such acids as orthophosphoric acid, alkali salts of phosphoric acid, such as ammonium phoshate, sodium phosphate, and potassium phosphate, alkaline earth metal salts of phosphoric acid, such as calcium phosphate and magnesium phosphate, and metal phosphates such as zinc phosphate, manganese phosphate, nickel phosphate, cobalt phosphate, and aluminum phosphate.

By the addition of phosphate ions, the reduction of hexavalent chromium ions by emulsion resin is facilitated during the film formation. At the same time, the salt of phosphate ions and trivalent chromium ions, which is difficult to dissolve, is formed, thereby enhancing the alkali- and corrosion-resistance of formed film.

Silica, which may be added to the inventive coating composition, may be in the form of fine particles having a primary-particle diameter of from 5 μm to 100 μm. Their production method may be the vapor-phase method and the liquid-phase method.

By the addition of silica, the hexavalent chromium is adsorbed on the surface of silica fine-particles and fixed by silica. Because of this effect of silica, it is possible to suppress the dissolution of hexavalent chromium and to enhance the corrosion-resistance of formed film. Heavy metal, such as cobalt, nickel, manganese, and zinc, which may be added to the inventive coating composition, is bonded with the chromic acid to form, during the coating formation, heavy metal salt of chromic acid, which is difficult to dissolve in water. The dissolution of hexavalent chromium is, therefore, lessened during the alkali degreasing, and the corrosion-resistance of un-painted and painted sheets is improved.

Desirably, the ions of heavy metals, such as cobalt, nickel, manganese, and zinc are supplied in the form of carbonate, hydroxide, oxide, and phosphate of these metals. Such compounds as sulfate, chloride, and nitrate can form, together with those metal ions, soluble salts. These compounds are not preferred, since they impede the formation of difficult-to-dissolve salt of metal ions and chromic acid.

Fluoride ions, which may be added to the inventive surface-treating composition, contribute to activation of the metallic surface during the coating formation. This, in turn, improves the adherence between the metallic surface and the coating, and hence the adherence between the metallic surface and paint film. The fluoride ions can be supplied in the form of hydrofluoric acid, hydro-zircofluoric acid, hydro-silicofluoric acid, hydrotitaniumfluoric acid, and hydro-borofluoric acid, as well as such fluorocompounds as the ammonium salt, lithium salt, sodium salt, and potassium salt of these acids.

Next, appropriate ranges of the additional amounts of these additives are: the weight ratio of $PO_4$/total chromium-0.05-5 for the phosphate ions; the weight ratio of $SiO_2$/total Cr-0.1-10 for silica fine particles; and the weight ratio of F/total Cr-0.01-0.5. Outside these ranges, the effects of addition are not very appreciable. With regard to the ions of metals, such as cobalt, nickel, zinc, and manganese, the proportion of gram equivalent of these metals plus trivalent chromium ions to gram equivalent of chromic acid plus phosphoric acid, i.e., (metal ions $+Cr^{3+}$)/($CrO_4^{2-}+PO_4^{2-}$), is desirably within the range of $\leq 0.5$. Outside this range, precipitates may be formed in the composition.

The materials, which are subjected to the inventive coating, are iron, aluminum, zinc, tin, copper and their alloys. The alloying element(s) added may be one or more of zinc, aluminum, chromium, silicon, cobalt, zirconium, tin, titanium, iron, lead, nickel, magnesium, manganese, molybdenum, and phosphorus. The materials, which are subjected to the inventive coating, may be the above mentioned ones which are plated, chromated, phosphated, or anodized. The materials, which are subjected to the inventive coating, may be in the form of sheets, coils, bars, or wires. Methods for applying the coating composition on the materials are brushing, spraying, roll-coating, showering, and dipping.

The coating composition, which is applied on the materials, is then dried and cured in a hot-blast oven, an infrared oven, a high frequency-induction oven, or the like.

Hereinafter are explained examples of the indices for treatment of a surface-treated steel sheet and an aluminum-sheet. The deposition amount of chromium is preferably from 1 to 500mg/$m^2$, more preferably from 5 to 300mg/$m^2$.

When the deposition amount of chromium is less than 1 mg/$m^2$, satisfactory corrosion-resistance is not obtained. On the other hand, when the deposition amount of chromium exceeds 500 mg/m², the coloration by Cr is so serious as to degrade the commercial value.

Similarly, the deposition amount of resin is preferably from 10 to 3000mg/m², more preferably from 50 to 1500 mg/m². When the deposition amount is less than 10 mg/m², the effects of resin are not satisfactory from the point of view of corrosion-resistance, resistance against finger marks and the adherence of paint film. None of corrosion-resistance, resistance against finger marks, and the adherence of paint film are enhanced, even by depositing more than 3000 mg/m² of the resin. Furthermore, weldability is lessened, thereby rendering the coating to be inappropriate for welding application.

It is necessary for realizing the crosslinking of the trivalent chromium and acrylic copolymer resin that the temperature of a sheet, on which the coating composition is applied, arrives at 80° C. or more during drying and curing of the coating composition. Such drying and curing conditions can be completely met in the existing lines of coating steels.

In the above descriptions, specific compounds are mentioned. The present invention is, however, not limited to these specific compounds but is defined by the appended claims.

Since the chromic acid, which is contained in the chromate-containing aqueous resin, is a strong acid and a strong oxidizer, an organic lubricant is subjected to coagulation and oxidation. Such phenomena as precipitation, coagulation, and viscosity-increase resulting in gel formation are, therefore, likely to occur in a chromate-containing aqueous resin with an organic lubricant. The coating adhesion of paint applied on the coating, in which the lubricant is dispersed, is disadvantageously lowered in the prior art.

The present invention provides: the use of a nonionic emulsifying agent which can stably disperse the lubricant; and the acryl series emulsion as the dispersion medium. The coating composition according to the present invention imparts, therefore, lubricating properties, corrosion-resistance, and painting properties to metallic materials.

The inventive coating, which is formed by drying the coating composition applied on materials, exhibits improved lubricating properties.

The coated materials can, therefore, be press-formed, for example deep drawn, without application of press oil or the like, provided that the forming degree of the articles is ordinary. Although the application of lubricating oil or the like is omitted, neither wear of the metal die nor rupture of a sheet occurs in such a case. The formability of the inventive coating has been demonstrated in a case of extremely severe press-forming: however, to improve such forming, press oil is occasionally used.

The inventive coating exhibits improved resistance against alkali degreasing and solvent degreasing (trichloroethane or the like). This, in turn, leads to virtual non-impairment of the coating properties during degreasing; that is, the coating properties subsequent to degreasing are virtually the same as those prior to degreasing. Improved formability of the inventive coating is, therefore, realized in a case where the contaminants, which generate during production, handling and storage of metallic materials, are removed by degreasing, and then the press forming is carried out.

The inventive coating imparts to metallic material improved corrosion-resistance and is firmly bonded with the metallic material. Because of improved rust-proofing and coating-adhesion, corrosion of the metallic material does not occur during prolonged storage.

Since the underlying metallic material does not corrode, and, further, the inventive coating does not peel, the lubricant does not leave the metallic material. Impairment of the lubricating properties due to corrosion and peeling of the coating film, therefore, does not occur.

The present invention is hereinafter described by way of Examples.

EXAMPLES

Production Example 1 of Acryl Series Emulsion The acrylic polymer-emulsion was obtained according to the following formulation.

| A) | Composition of the monomer emulsion | |
|---|---|---|
| | Deionized water | 150 parts by weight |
| | Emarugen 840 S[1] | 16 parts by weight |
| | Pronon #208[2] | 2 parts by weight |
| | Methacrylic acid | 4 parts by weight |
| | Methoxyethylene-acryl amide | 2 parts by weight |
| | n-butyl acrylate | 82 parts by weight |
| | Methyl methacrylate | 112 parts by weight |
| B) | Composition loaded in a four-opening flask | |
| | Deionized water | 116 parts by weight |
| | Emarugen 840 S | 4 parts by weight |
| | Pronon #208 | 4 parts by weight |
| C) | Polymerization initiator | |
| | 5% ammonium persulfate aqueous solution | 10 parts by weight |
| | 5% acidic, sodium sulfite aqueous solution | 10 parts by weight |
| | 1) 70% aqueous solution of polyoxyethylene octylphenyl ether (nonionic emulsifying agent produced by Kao Corp.) | |
| | 2) Polyoxyethylene-polyoxypropylene block polymer (nonionic emulsifying agent produced by Nippon Oil & Fats Co., Ltd.) | |

(Polymerizing Method)

B) was loaded into a four-opening, 1-litre flask provided with a stirring device, warmed, dissolved, and held at 40° C. A) was loaded in another flask, a three-opening, conical 0.5-1 litre flask provided with a common plug, so as to prepare the monomer emulsion. 10% of this monomer, was added 25% of the 5% ammonium persulfate aqueous solution and 25% of the 5% acidic sodium sulfite aqueous solution. Polymerization was then carried out at 40°-50° C. for 15 to 20 minutes. The remaining 90% of A) and the remaining 75% of the polymerization initiator were added dropwise, at temperature of 40°-50° C., over 3 hours. After completion of the addition, the solution was held at 40°-50° C. for 1 hour so as to complete polymerization. The emulsion obtained had a concentration of 43%, viscosity of 300 cp, and pH of 2.2.

Production Examples 2-4 (Examples 3 and 4 are comparative)

The monomer composition and emulsifying agent of Production Example 1 are changed as given in Table 1.

Dispersion Example 1 of Lubricant

The emulsion of lubricant is obtained by the following method.

Paraffin wax (40 parts by weight, produced by Nippon Seiro Co., Ltd., product name-155) was heated to melting point. To this wax, 2 parts by weight of polyoxyethylene stearylether were added and melted together. Then, 55 parts by weight of deionized water having a temperature of from 95° to 99° C. was added, for 10 minutes, to the melt which was held at 97° C. while stirring at 100 rpm. After the addition, the mixed liquid of wax-deionized water was allowed to cool down to room temperature, while stirring at 20 rpm. The wax concentration was adjusted by means of the deionized water so as to obtain a paraffin-wax emulsion having 40% by weight of wax concentration.

Dispersion Examples 2-12 of Lubricant Dispersion
(Examples 8-12 are comparative)

Examples 1-12

Acryl-series polymer emulsions obtained in Production Examples 1 and 2, inorganic compounds, such as hexavalent chromium ($CrO_3$ was used) or hexavalent chromium and trivalent chromium (hexavalent chromium was partially reduced by methanol), and the lubricant emulsion obtained by its Production Examples 1 through 7 were mixed to obtain the surface-treating compositions given in Table 3(1). These compositions were roll-coated on Zn-electroplated steel sheets so as to provide a coating having 1 $g/m^2$ after drying of the coating and, subsequently, dried by a hot blast of air at a temperature of 100° C. in terms of arrival temperature of sheets. The resultant samples were subjected to tests of stability of the coating compositions and properties of the samples. The results are given in Table 3.

Comparative Examples 1 through 11

The acryl-series polymer emulsions obtained in Production Examples 3 and 4, the lubricants obtained in Production Examples 8 through 12 and the hexavalent and trivalent chromium were mixed to obtain the comparative, surface-treating compositions given in Table 3(2). These compositions were applied and dried by the methods described above to provide the samples, on which the comparative compositions were applied. The stability of the comparative surface-treating compositions and properties of the samples are given in Table 3.

Testing Methods and Judgement Criteria a) Stability

The treating compositions of the metal surface were allowed to stand in a constant-temperature of 40° C. The time elapse until gelling is indicated by the following symbols.
○—30 days or more
△—from 7 to less than 30 days
×—less than 7 days b) Corrosion-resistance of Unpainted Sheets The salt-water spraying test (JIS-Z-2371) was carried out for 144 hours onto the inventive and comparative samples, without further coating of paint. The area of rust generated was measured.

c) Corrosion-resistance of Painted Sheets

Baking type melamine alkyd resin was applied on the inventive and comparative samples to form a paint coating having a thickness of 20±2 μm.

The flaws were engraved by a cutter on the paint film until they reached the metallic substrate. The salt water spraying test was carried out for 200 hours. Then, the peeling test was carried out. The average peeling width on both sides of the flaws were measured for judgement.
◎—no peeling
○—peeling width—from 0.1 to 3.0 mm
×—peeling width—3.1 mm or more d) Adherence of Paint Film On the above-mentioned painted sheets 100 cells, each 1 mm square, were engraved. After extruding by 5 mm by means of an Erichsen tester, the peeling of tapes was carried out and the number of remaining cells was then calculated.

e) Deep Drawability

A cylindrical deep drawing test was carried out under the condition of: 96 mm of the blank diameter; 40 mm in punch size; and 1 ton of blank holder pressure.
○—drawing through and such abnormalities as building up of coating are not observed.
×—deep drawing is impossible The above tests a) through d) were carried out before and after the alkali-degreasing of the inventive and comparative samples. The alkali detergent solution contained 0.2% of alkali-degreasing agent (Palklin N-364S, a product of Nihon Parkerizing Co., Ltd.) This solution was sprayed for 2 minutes at 60°-65° C. in terms of liquid temperature and 0.8 $kg/cm^2$ of pressure.

TABLE 1

| Monomers and Emulsifying agents | | Production Example | | | |
|---|---|---|---|---|---|
| | | 1 | 2 | 3 | 4 |
| Monomers | Methacrylic acid | 4 | 4 | — | 4 |
| | Methoxy-ethylene acrylamide | 2 | — | 2 | — |
| | Methoxy-ethyl acrylate | — | 82 | — | — |
| | n-butyl acrylate | 82 | — | 82 | 82 |
| | Methyl methacrylate | 112 | — | 116 | 112 |
| | Styrene | — | 114 | — | — |
| Emulsifying agents | Emarugen 840S | 14 | 14 | 14 | 10 |
| | Pronon 208 | 6 | 6 | 6 | 6 |
| | Emal O[3)] | — | — | — | 4 |

[3)]Sodium laurylsulfate (Anionic emulsifying agent produced by Kao Corp.)

Table 2

| | Dispersion Examples of Lubricants | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Lubricants | | | | | | | | | | | | |
| Paraffin wax 1) | 40 | — | — | — | — | — | — | — | — | — | — | — |
| Oxidation-type paraffin wax 2) | — | 40 | — | — | — | — | — | 40 | 40 | 40 | 40 | 40 |
| Polyethylene 3) | — | — | 40 | — | — | — | — | — | — | — | — | — |
| Polyethylene 4) | — | — | — | 40 | — | — | — | — | — | — | — | — |
| Oxidation type polyethylene 5) | — | — | — | — | 40 | — | — | — | — | — | — | — |
| Oxidation type polyethylene 6) | — | — | — | — | — | 40 | — | — | — | — | — | — |
| Methylene bisstearylamide | — | — | — | — | — | — | 40 | — | — | — | — | — |
| Emulsifying Agents | | | | | | | | | | | | |
| Sorbitan monostearate | 2 | — | 2 | 2 | — | — | — | — | 2 | — | — | 2 |
| Polyoxyethylene stearylether | 3 | — | 3 | 3 | — | — | 2 | — | — | — | — | 3 |
| Alkylolamide series emulsifying agent 7) | — | 4 | — | — | 4 | 4 | 2 | — | — | — | — | — |

Table 2-continued

| | Dispersion Examples of Lubricants | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Oleic acid | — | — | — | — | — | — | — | 4 | 4 | — | — | 4 |
| Stearic acid | — | — | — | — | — | — | — | — | — | 4 | — | — |
| Triethanolamine | — | — | — | — | — | — | — | 4 | — | 4 | — | — |
| Morpholine | — | — | — | — | — | — | — | — | 4 | — | — | 4 |
| Stearylamine | — | — | — | — | — | — | — | — | — | — | 6.4 | — |
| Acetic acid | — | — | — | — | — | — | — | — | — | — | 1.4 | — |
| Ionic property of Emulsifying Agents 8) | N | N | N | N | N | N | N | A | A | A | C | N + C |

1) Product 155 of Nippon Seiro Co., Ltd.
2) Product NPS-9125 of Nippon Seiro Co., Ltd.
3) Product 100P of Mitsui Petroleum Chemistry Industries Co., Ltd.
4) Product 110P of Mitsui Petroleum Chemistry Industries Co., Ltd.
5) Product 220MP of Mitsui Petroleum Chemistry Industries Co., Ltd.
6) Product 4202E of Mitsui Petroleum Chemistry Industries Co., Ltd.
7) Product Prophane 2012E of Sanyo Chemical Industries Ltd.
8) N-nonionic, A-anionic, C-cationic

TABLE 3 (1)

Coating Composition for Metal (Weight %)

| | | Examples | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Inorganic Compound | $Cr^{6+}$ | 2.6 | 2.6 | 2.6 | 2.6 | 2.6 | 2.6 | 2.6 | 2.6 | 2.6 | 2.6 | 2.6 | 2.6 |
| | $Cr^{3+}$ | 1.3 | 1.3 | 1.3 | 1.3 | 1.3 | 1.3 | 1.3 | 1.3 | 1.3 | 1.3 | 1.3 | 1.3 |
| | $H_3PO_4$ | — | — | — | — | — | — | — | — | — | — | 6 | 6 |
| | Metal Ions | — | — | — | — | — | — | — | — | — | — | $Co^{2+}$ 1.5 | $Mn^{2+}$ 1.5 |
| Acryl Series Polymer Emulsion Production Examples | 1 | 34 | 34 | 34 | 34 | 34 | 34 | 34 | 34 | 34 | — | 34 | 34 |
| | 2 | — | 34 | — | — | — | — | 34 | — | — | — | — | — |
| | 3 | — | — | 34 | — | 34 | — | — | — | — | — | — | — |
| | 4 | — | — | — | 34 | — | — | — | — | — | — | — | — |
| Lubricant Dispersions Dispersion Examples | 1 | 5 | 10 | 20 | — | — | — | — | — | — | 10 | 10 | 10 |
| | 2 | — | — | — | 10 | — | — | — | — | — | — | — | — |
| | 3 | — | — | — | — | 10 | — | — | — | — | — | — | — |
| | 4 | — | — | — | — | — | 10 | — | — | — | — | — | — |
| | 5 | — | — | — | — | — | — | 10 | — | — | — | — | — |
| | 6 | — | — | — | — | — | — | — | 10 | — | — | — | — |
| | 7 | — | — | — | — | — | — | — | — | 10 | — | — | — |
| | 8 | — | — | — | — | — | — | — | — | — | — | — | — |
| | 9 | — | — | — | — | — | — | — | — | — | — | — | — |
| | 10 | — | — | — | — | — | — | — | — | — | — | — | — |
| | 11 | — | — | — | — | — | — | — | — | — | — | — | — |
| | 12 | — | — | — | — | — | — | — | — | — | — | — | — |

TABLE 3 (2)

Coating Composition for Metal (Weight %)

| | | Examples | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Inorganic Compound | $Cr^{6+}$ | 2.6 | 2.6 | 2.6 | — | 2.6 | 2.6 | 2.6 | 2.6 | 2.6 | 2.6 | 2.6 | 2.6 | 2.6 |
| | $Cr^{3+}$ | 1.3 | 1.3 | 1.3 | — | 1.3 | 1.3 | 1.3 | 1.3 | 1.3 | 1.3 | 1.3 | 1.3 | 1.3 |
| | $H_3PO_4$ | — | 6 | 6 | — | — | — | — | — | — | — | — | — | — |
| | Metal Ions | — | $Co^{2+}$ 1.5 | $Mn^{2+}$ 1.5 | — | — | — | — | — | — | — | — | — | — |
| Acryl Series Polymer Emulsion Production Examples | 1 | 34 | 34 | 34 | 34 | — | — | 34 | 34 | 34 | — | — | 34 | 34 |
| | 2 | — | — | — | — | — | — | — | — | — | — | — | — | — |
| | 3 | — | — | — | — | 34 | — | — | — | — | — | — | — | — |
| | 4 | — | — | — | — | — | 34 | — | — | — | — | — | — | — |
| Lubricant Dispersions Dispersion Examples | 1 | — | — | — | — | — | — | — | — | — | — | — | 0.4 | 50 |
| | 2 | — | — | — | — | — | — | — | — | — | — | — | — | — |
| | 3 | — | — | — | — | — | — | — | — | — | — | — | — | — |
| | 4 | — | — | — | — | — | — | — | — | — | — | — | — | — |
| | 5 | — | — | — | — | — | — | — | — | — | — | — | — | — |
| | 6 | — | — | — | — | — | — | — | — | — | — | — | — | — |
| | 7 | — | — | — | — | — | — | — | — | — | — | — | — | — |
| | 8 | — | — | 10 | — | — | — | — | — | — | — | — | — | — |
| | 9 | — | — | — | 10 | — | — | — | — | — | — | — | — | — |
| | 10 | — | — | — | — | 10 | — | — | — | — | — | — | — | — |
| | 11 | — | — | — | — | — | 10 | — | — | — | — | — | — | — |
| | 12 | — | — | — | — | — | — | — | 10 | — | — | — | — | — |

TABLE 3 (3)

Stability of Compositions and Properties of Samples

| | Examples | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Stability Before Degreasing | O | O | O | O | O | O | O | O | O | O | O | O |
| Deep Drawability | O | O | O | O | O | O | O | O | O | O | O | O |
| Corrosion Resistance of Unpainted Sheet | O | O | O | O | O | O | O | O | O | O | O | O |
| Corrosion Resistance of Painted Sheet | O | O | O | O | O | O | O | O | O | O | ⊙ | ⊙ |
| Adherence of Paint Film | O | O | O | O | O | O | O | O | O | O | ⊙ | ⊙ |
| After Degreasing | | | | | | | | | | | | |
| Corrosion Resistance of Unpainted sheet | O | O | O | O | O | O | O | O | O | O | O | O |
| Corrosion Resistance of Painted Sheet | O | O | O | O | O | O | O | O | O | O | ⊙ | ⊙ |
| Adherence of Paint Film | O | O | O | O | O | O | O | O | O | O | O | O |

TABLE 3(4)

Stability of Comparative Compositions and Properties of Comparative Samples

| | Comparative Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Stability Before Degreasing | O | O | O | O | O | X | X | X | X | X | X | O | O |
| Deep Drawability | X | X | X | X | X | — | — | — | — | — | — | X | O |
| Corrosion Resistance of Unpainted Sheet | O | O | O | X | O | — | — | — | — | — | — | O | O |
| Corrosion Resistance of Painted Sheet | O | ⊙ | ⊙ | X | X | — | — | — | — | — | — | O | O |
| Adherence of Paint Film | O | O | O | X | X | — | — | — | — | — | — | O | X |
| After Degreasing | | | | | | | | | | | | | |
| Corrosion Resistance of Unpainted sheet | O | O | O | X | Δ | — | — | — | — | — | — | O | X |
| Corrosion Resistance of Painted Sheet | O | ⊙ | ⊙ | X | X | — | — | — | — | — | — | O | X |
| Adherence of Paint Film | O | O | O | X | X | — | — | — | — | — | — | O | X |

We claim:

1. A surface-treating composition for metallic surfaces which contains hexavalent chromium ions or hexavalent and trivalent chromium ions as an inorganic compound, and a mixture of acryl-series polymer emulsion set forth below and one or more lubricants dispersed by an emulsifying agent set forth below, wherein from 1 to 50% by weight (in terms of nonvolatile matters) of one or more lubricants as a lubricating component are dispersed by a first nonionic emulsifying agent which has been added for preventing coagulation of the lubricating component in the surface-treating composition wherein said emulsifying agent is added to the lubricating component and the emulsifying agent and the lubricating component are melted together, the surface-treating composition having a pH of 5 of less, wherein said acryl-series polymer emulsion is obtained by emulsion-polymerizing, by means of a second nonionic emulsifying agent which is essentially free of anionic emulsifying agent and cationic emulsifying agent and which contains a polyoxyethylene-polyoxypropylene block copolymer, monomers of 1), 2) and 3):

1) one or more monomer of ethylene-series, unsaturated carboxylic acid
2) one or more monomers selected from a), b), and c):

a) alkoxyethylene (metha)acrylamide and its derivatives(s) expressed by the following general formula

X is $C_nH_{2n+1}$ (n=0 or 1)
   Y is $C_mH_{2m+1}$ (m=0–4)
   b) acid phospho-oxyalkyl(metha)acrylate, and
   c) alkoxy-alkyl(metha)acrylate 3) one or more acryl-series monomers (a part of which may consist of 2) (c)).

2. A coating composition for metallic surfaces according to claim 1, wherein said inorganic compound further includes at least one member selected from a group consisting of (i) phosphoric acid, (ii) silica, and (iii) one or more metal ions of cobalt, nickel, manganese, and zinc.

3. A coating composition for metallic surfaces according to claim 1 or 2, wherein fluoride ions are further included as the inorganic compound.

4. A coating composition for metallic surfaces according to claim 1, wherein the proportion of acryl-series polymer emulsion to total chromium ions is from 200 to 0.2.

* * * * *